US010990373B2

(12) United States Patent
Olderdissen et al.

(10) Patent No.: US 10,990,373 B2
(45) Date of Patent: Apr. 27, 2021

(54) SERVICE MANAGERS AND FIRMWARE VERSION SELECTIONS IN DISTRIBUTED COMPUTING SYSTEMS

(71) Applicant: Nutanix, Inc., San Jose, CA (US)

(72) Inventors: Jan Olderdissen, Herrenberg (DE); Raghu Prasad Rapole, Telangana (IN); Sragdhara Datta Chaudhuri, Bangalore (IN); Thomas Jason Hill, Los Gatos, CA (US); Vidhi Taneja, Cupertino, CA (US); Jerome Joseph, Sunnyvale, CA (US); Viraj Sapre, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/984,164

(22) Filed: May 18, 2018

(65) Prior Publication Data

US 2019/0354359 A1 Nov. 21, 2019

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45562* (2013.01); *G06F 2009/45579* (2013.01)

(58) Field of Classification Search
CPC ............ G06F 8/60–65; G06F 9/45558; G06F 2009/45562; G06F 2009/45579
See application file for complete search history.

(56) References Cited

U.S. PATENT DOCUMENTS

| 8,549,518 | B1 | 10/2013 | Aron et al. |
| 8,555,273 | B1 | 10/2013 | Chia et al. |
| 8,601,473 | B1 | 12/2013 | Aron et al. |
| 8,850,130 | B1 | 9/2014 | Aron et al. |
| 8,863,124 | B1 | 10/2014 | Aron |
| 9,009,106 | B1 | 4/2015 | Aron et al. |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,747,287 | B1 | 8/2017 | Bhardwaj et al. |

(Continued)

OTHER PUBLICATIONS

G. Jabłoński, P. Perek et al., "Firmware Upgrade in xTCA Systems", [Online], pp. 3639-3646, [Retrieved from Interent on Mar. 13, 2021], <https://ieeexplore.ieee.org/stamp/stamp.jsp?arnumber=6590029> (Year: 2013).*

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Ziaul A Chowdhury
(74) *Attorney, Agent, or Firm* — Dorsey & Whitney LLP (57) ABSTRACT

Examples of systems and methods are described for selecting firmware versions of multiple components for a distributed computing system (e.g., a cluster). Multiple selection interfaces may be presented to a user who may select at least one firmware version of at least one component. Based on the user selection(s), a service manager may evaluate firmware component dependencies and identify compatible firmware versions of other components for installation. In this manner, a set of firmware versions may be installed and/or upgraded which may be different than a current set of versions and/or a set of versions recommended in a wholly automated manner.

22 Claims, 3 Drawing Sheets

(56) References Cited

U.S. PATENT DOCUMENTS

| | | | |
|---|---|---|---|
| 9,772,866 B1 | 9/2017 | Aron et al. | |
| 10,481,893 B1* | 11/2019 | Righi | G06F 8/63 |
| 2005/0245249 A1* | 11/2005 | Wierman | H04M 1/72406 |
| | | | 455/419 |
| 2008/0028395 A1 | 1/2008 | Motta et al. | |
| 2010/0218178 A1 | 8/2010 | Sakai | |
| 2011/0239208 A1 | 9/2011 | Jung et al. | |
| 2012/0117555 A1 | 5/2012 | Banerjee et al. | |
| 2012/0291021 A1 | 11/2012 | Banerjee et al. | |
| 2013/0074061 A1 | 3/2013 | Averbuch et al. | |
| 2014/0040875 A1* | 2/2014 | Bower, III | G06F 8/65 |
| | | | 717/170 |
| 2014/0047430 A1 | 2/2014 | Kanematsu | |
| 2014/0115574 A1 | 4/2014 | Valentine et al. | |
| 2015/0378716 A1* | 12/2015 | Singh | H04W 4/60 |
| | | | 717/172 |
| 2016/0062847 A1* | 3/2016 | Filippov | G06F 16/113 |
| | | | 707/640 |
| 2016/0124744 A1* | 5/2016 | Kruglick | G06F 8/65 |
| | | | 717/121 |
| 2016/0162270 A1* | 6/2016 | Kumar | G06F 8/61 |
| | | | 717/177 |
| 2016/0283221 A1 | 9/2016 | Kochar et al. | |
| 2017/0017679 A1 | 1/2017 | Jurowicz et al. | |
| 2017/0078444 A1* | 3/2017 | Rajwat | H04L 67/34 |
| 2017/0147322 A1* | 5/2017 | Vopni | G06F 8/65 |
| 2018/0150372 A1* | 5/2018 | Nachimuthu | H04L 67/10 |
| 2018/0357058 A1* | 12/2018 | Malaspina | G06F 8/71 |
| 2019/0102203 A1* | 4/2019 | Wang | G06F 40/35 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, Ignacio et al. "Curator: Self-Managing Storage for Enterprise Clusters"; University of Washington; published Mar. 2017; pp. all.

* cited by examiner

SERVICE MANAGERS AND FIRMWARE VERSION SELECTIONS IN DISTRIBUTED COMPUTING SYSTEMS

TECHNICAL FIELD

Examples described herein generally relate to virtualized (e.g. distributed) computing systems. Examples of systems are described which include tools to evaluate dependencies between firmware versions to maintain performance when installing and/or upgrading firmware components.

BACKGROUND

A virtual machine (VM) generally refers to a software-based implementation of a machine in a virtualization environment, in which the hardware resources of a physical computer (e.g., CPU, memory, etc.) are virtualized or transformed into the underlying support for the fully functional virtual machine that can run its own operating system and applications on the underlying physical resources just like a real computer.

Virtualization generally works by inserting a thin layer of software directly on the computer hardware or on a host operating system. This layer of software contains a virtual machine monitor or "hypervisor" that allocates hardware resources dynamically and transparently. Multiple operating systems may run concurrently on a single physical computer and share hardware resources with each other. By encapsulating an entire machine, including CPU, memory, operating system, and network devices, a virtual machine may be completely compatible with most standard operating systems, applications, and device drivers. Most modern implementations allow several operating systems and applications to safely run at the same time on a single computer, with each having access to the resources it needs when it needs them.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine may not be utilized to perform useful work. This may be wasteful and inefficient if there are users on other physical machines which are currently waiting for computing resources. Virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

As virtualized systems become increasingly complex, their installation and maintenance becomes complex. Various components may desirably require upgrade at various times.

DETAILED DESCRIPTION

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Figure 1:
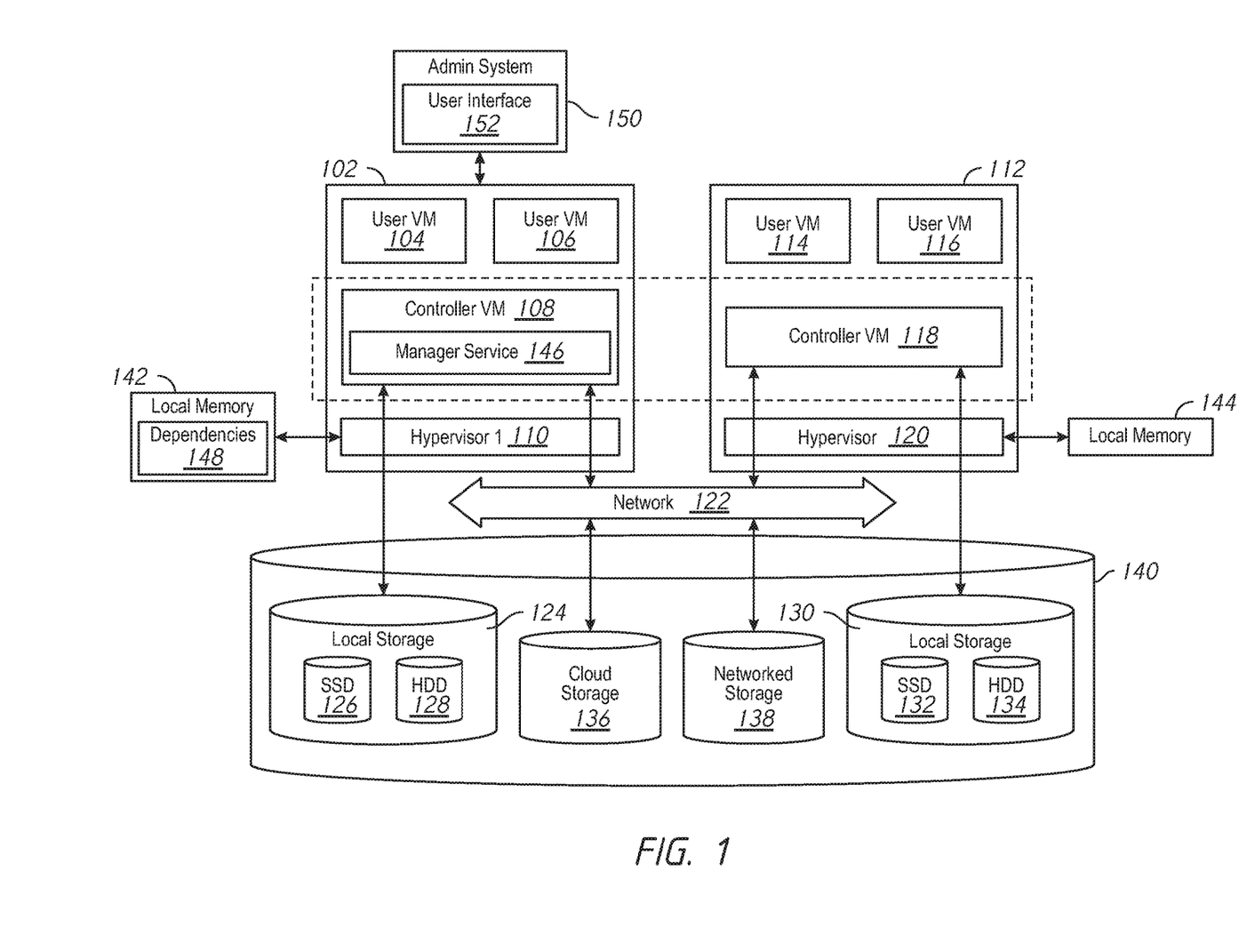
FIG. 1 is a block diagram of a distributed computing system, in accordance with embodiments described herein.

FIG. 1 is a block diagram of a distributed computing system, in accordance with embodiments described herein. The distributed computing system of FIG. 1 generally includes computing node 102 and computing node 112 and storage 140 connected to a network 122. The network 122 may be any type of network capable of routing data transmissions from one network device (e.g., computing node 102, computing node 112, and storage 140) to another. For example, the network 122 may be a local area network (LAN), wide area network (WAN), intranet, Internet, or a combination thereof. The network 122 may be a wired network, a wireless network, or a combination thereof.

The storage 140 may include local storage 124, local storage 130, cloud storage 136, and networked storage 138. The local storage 124 may include, for example, one or more solid state drives (SSD 126) and one or more hard disk drives (HDD 128). Similarly, local storage 130 may include SSD 132 and HDD 134. Local storage 124 and local storage 130 may be directly coupled to, included in, and/or accessible by a respective computing node 102 and/or computing node 112 without communicating via the network 122. Other nodes, however, may access the local storage 124 and/or the local storage 130 using the network 122. Cloud storage 136 may include one or more storage servers that may be stored remotely to the computing node 102 and/or computing node 112 and accessed via the network 122. The cloud storage 136 may generally include any type of storage device, such as HDDs SSDs, or optical drives. Networked storage 138 may include one or more storage devices coupled to and accessed via the network 122. The networked storage 138 may generally include any type of storage device, such as HDDs SSDs, and/or NVM Express (NVMe). In various embodiments, the networked storage 138 may be a storage area network (SAN). The computing node 102 is a computing device for hosting virtual machines (VMs) in the distributed computing system of FIG. 1. The computing node 102 may be, for example, a server computer. The computing node 102 may include one or more physical computing components, such as processors.

The computing node 102 is configured to execute a hypervisor 110, a controller VM 108 and one or more user VMs, such as user VMs 104, 106. The user VMs including user VM 104 and user VM 106 are virtual machine instances executing on the computing node 102. The user VMs including user VM 104 and user VM 106 may share a virtualized pool of physical computing resources such as physical processors and storage (e.g., storage 140). The user VMs including user VM 104 and user VM 106 may each have their own operating system, such as Windows or Linux. While a certain number of user VMs are shown, generally any number may be implemented. User VMs may generally be provided to execute any number of applications which may be desired by a user.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, user VM 106, and controller VM 108) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller VMs (CVMs) described herein, such as the controller VM 108 and/or controller VM 118, may provide services for the user VMs in the computing node. As an example of functionality that a controller VM may provide, the controller VM 108 may provide virtualization of the storage 140. Controller VMs may provide management of the distributed computing system shown in FIG. 1. Examples of controller VMs may execute a variety of software and/or may serve the I/O operations for the hypervisor and VMs running on that node. In some examples, a SCSI controller, which may manage SSD and/or HDD devices described herein, may be directly passed to the CVM, e.g., leveraging PCI Passthrough in some examples. In this manner, controller VMs described herein may manage input/output (I/O) requests between VMs on a computing node and available storage, such as storage 140.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and user VM 106. The controller VM 118 may be implemented as described above with respect to controller VM 108. The hypervisor 120 may be implemented as described above with respect to the hypervisor 110. In the embodiment of FIG. 1, the hypervisor 120 may be a different type of hypervisor than the hypervisor 110. For example, the hypervisor 120 may be Hyper-V, while the hypervisor 110 may be ESX(i). In some examples, the hypervisor 110 may be of a same type as the hypervisor 120.

The controller VM 108 and controller VM 118 may communicate with one another via the network 122. By linking the controller VM 108 and controller VM 118 together via the network 122, a distributed network of computing nodes including computing node 102 and computing node 112, can be created.

Controller VMs, such as controller VM 108 and controller VM 118, may each execute a variety of services and may coordinate, for example, through communication over network 122. Services running on controller VMs may utilize an amount of local memory to support their operations. For example, services running on controller VM 108 may utilize memory in local memory 142. Services running on controller VM 118 may utilize memory in local memory 144. The local memory 142 and local memory 144 may be shared by VMs on computing node 102 and computing node 112, respectively, and the use of local memory 142 and/or local memory 144 may be controlled by hypervisor 110 and hypervisor 120, respectively. Moreover, multiple instances of the same service may be running throughout the distributed system—e.g. a same services stack may be operating on each controller VM. For example, an instance of a service may be running on controller VM 108 and a second instance of the service may be running on controller VM 118.

Generally, controller VMs described herein, such as controller VM 108 and controller VM 118 may be employed to control and manage any type of storage device, including all those shown in storage 140 of FIG. 1, including local storage 124 (e.g., SSD 126 and HDD 128), cloud storage 136, and networked storage 138. Controller VMs described herein may implement storage controller logic and may virtualize all storage hardware as one global resource pool (e.g., storage 140) that may provide reliability, availability, and performance. IP-based requests are generally used (e.g., by user VMs described herein) to send I/O requests to the controller VMs. For example, user VM 104 and user VM 106 may send storage requests to controller VM 108 using over a virtual bus. Controller VMs described herein, such as controller VM 108, may directly implement storage and I/O optimizations within the direct data access path. Communication between hypervisors and controller VMs described herein may occur using IP requests.

Note that controller VMs are provided as virtual machines utilizing hypervisors described herein—for example, the controller VM 108 is provided behind hypervisor 110. Since the controller VMs run "above" the hypervisors examples described herein may be implemented within any virtual machine architecture, since the controller VMs may be used in conjunction with generally any hypervisor from any virtualization vendor.

Virtual disks (vDisks) may be structured from the storage devices in storage 140, as described herein. A vDisk generally refers to the storage abstraction that may be exposed by a controller VM to be used by a user VM. In some examples, the vDisk may be exposed via iSCSI ("internet small computer system interface") or NFS ("network file system") and may be mounted as a virtual disk on the user VM. For example, the controller VM 108 may expose one or more vDisks of the storage 140 and the hypervisor may attach the vDisks to one or more VMs, and the virtualized operating system may mount a vDisk on one or more user VMs, such as user VM 104 and/or user VM 106.

During operation, user VMs (e.g., user VM 104 and/or user VM 106) may provide storage input/output (I/O) requests to controller VMs (e.g., controller VM 108 and/or hypervisor 110). Accordingly, a user VM may provide an I/O request over a virtual bus to a hypervisor as an iSCSI and/or NFS request. Internet Small Computer System Interface (iSCSI) generally refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. Network File System (NFS) refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, examples of user VMs described herein may provide storage requests. The storage requests may designate the IP address for a controller VM from which the user VM desires I/O services. The storage request may be provided from the user VM to a virtual switch within a hypervisor to be routed to the correct destination. For examples, the user VM 104 may provide a storage request to hypervisor 110. The storage request may request I/O services from controller VM 108 and/or controller VM 118. If the request is to be intended to be handled by a controller VM in a same service node as the user VM (e.g., controller VM 108 in the same computing node as user VM 104) then the storage request may be internally routed within computing node 102 to the controller VM 108. In some examples, the storage request may be directed to a controller VM on another computing node. Accordingly, the hypervisor (e.g., hypervisor 110) may provide the storage request to a physical switch to be sent over a network (e.g., network 122) to another computing node running the requested controller VM (e.g., computing node 112 running controller VM 118).

Generally, VMs described herein may be presented with a virtual block device, to which the VM may send block commands, such as read and write. The hypervisor backs this virtual device and in turn forwards the IO commands to a controller VM, using a protocol such as NFS or iSCSI. The interface between user VMs and the hypervisor can be a virtualized hard disk controller, such as SATA, or a virtualization-aware I/O bus using, for example, a ring buffer such as virtio.

Accordingly, hypervisors described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every computing node within a virtualized computing system (e.g., a cluster of computing nodes that run hypervisor virtualization software), since each computing node may include its own controller VM. Each new computing node in the system may include a controller VM to share in the overall workload of the system to handle storage tasks. Therefore, examples described herein may be advantageously scalable, and may provide advantages over approaches that have a limited number of controllers. Consequently, examples described herein may provide a massively-parallel storage architecture that scales as and when hypervisor computing nodes are added to the system.

The computing nodes and storage shown in FIG. 1 may be referred to as a distributed system, a virtualized system, and/or a cluster. Examples of system described herein may include one or more administrative systems, such as admin system 150 of FIG. 1 which may facilitate administration (e.g., installation and/or maintenance) of distributed systems (e.g., clusters) described herein. The admin system 150 may be implemented using generally any computer system (e.g., a server, tablet, mobile phone). The admin system 150 may be in communication with one or more distributed systems (e.g., over a network, such as the network 122). For example, the admin system 150 may be in communication with the computing node 102 and may be in communication with the manager service 146. The admin system 150 may include one or more input/output devices including, but not limited to, display(s), keyboard(s), touch screen(s), mice, communication interface(s), or combinations thereof. The admin system 150 may include one or more processors and memory encoded with executable instructions for performing actions of admin systems described herein. For example, the admin system 150 may implement a user interface 152. The user interface 152 may be used to provide user input to select at least one version of a firmware component to use. The user interface 152 may accordingly display selections for versions of other firmware components to be used by the cluster in accordance with dependencies between the firmware versions.

Note that computing nodes of clusters described herein, such as the computing nodes (e.g., computing node 102 and computing node 112) shown in FIG. 1, may include a variety of components. Some components may be associated with firmware (e.g., firmware components). Firmware components which may be included in computing nodes include, but are not limited to, disk(s), processor(s), baseboard management controller(s) (BMC), BIOS, a host bus adapter (HBA), a network interface controller (NIC), or combinations thereof. Each of the computing nodes may include various of these components. Examples of systems described herein may include one or more manager services which may be used to aid in ensuring operation of the various components remains compatible as the cluster is operated.

Generally, if a user (e.g., an administrator) of a cluster desires to upgrade multiple components, the user may need to be aware of the dependencies and compatibilities between the components. Without ensuring that the dependencies are adhered to, a particular combination of the component versions may be more likely to generate failure of the cluster, and may contribute to downtime in some examples. As the number of components in the cluster increase, evaluating the dependencies may become more complex and involve multiple permutations.

For example, firmware components may have a variety of firmware versions. New firmware versions may, for example, be promulgated by the developer of a particular component. The firmware versions may have dependencies. For example, in order to utilize a particular version of a firmware component, it may be necessary to utilize another particular version of another firmware component. As another example, in order to utilize a particular version of a firmware component, it may be necessary to have a minimum version of another firmware component, or to be within a particular range of versions for the other firmware component. As clusters grow, and the number of components and number of firmware versions for the components, grow, it can be an increasingly challenging task to ensure installations and/or upgrades occur appropriately to ensure dependencies are met and the cluster continues to function without conflict between different versions of firmware components.

Examples of controller virtual machines described herein, such as controller VM 108 of FIG. 1 may provide a manager service, such as manager service 146. For example, the controller VM 108 may include executable instructions for providing manager service 146, which may be executed by computing node 102. While a single instance of a manager service is shown in FIG. 1, generally any number of instances of manager services may be provided in a cluster. For example, other controller VMs in the cluster (such as controller VM 118) may provide an instance of a manager service. In some examples, one instance of the manager service, such as the instance manager service 146 may be a leader service and may provide coordination amongst the instances of manager services and/or may communicate with external systems, such as admin system 150.

Manager services described herein may utilize data regarding dependencies between various versions of firmware for various components of computing nodes in the cluster. The dependencies may be stored in storage accessible to the manager service. For example, dependencies 148 may be stored in local memory 142 of FIG. 1 for access by manager service 146. In other examples, the dependencies 148 may be stored in storage 140. The data regarding dependencies may include a list or other data structure providing information regarding firmware versions of other computing node components which are required to utilize a particular version of a particular component. The dependencies may be absolute—for example a particular firmware version for component X may be required in order to operating a particular firmware version for component Y. The dependencies may be relative—for example, to utilize a particular firmware version for component Y, a minimum firmware version for component X may be specified in the dependencies 148. The dependency may be satisfied by inclusion of the minimum firmware version for component X, or any more recent version. The dependencies may be made with reference to a group—for example, to utilize a particular firmware version for component Y, any of a group of firmware versions for component X may be used—including a list of multiple firmware versions and/or a range of firmware versions. While examples have been described here with reference to two components (e.g., component X and component Y), it is to be understood that dependencies may be stored for any number of components, and the dependencies between components may be inter-related. For example, use of a firmware version for component X may impose certain constraints on the firmware versions used for component Y, which in turn (or in addition) may impose certain constraints on the firmware versions used for component Z.

Examples described herein may be used to identify and/or select firmware versions for multiple firmware components of a computing node to provide compatible operation of the computing node. During operation, the admin system 150 may display, using user interface 152, selection interfaces corresponding to each of a plurality of firmware components. For example, one selection interface may be displayed per component used by a computing node. Not all components may have selection interfaces displayed—some components may have a fixed firmware version and/or may not be involved in the firmware version selection techniques described herein.

Any of a variety of selection interfaces may be used. Slider bars may be used in some examples. A list with radio buttons, check boxes, or other indicators may be used in some examples. A drop-down list may be used in some examples. Other selection interfaces may be used in other examples.

Setpoints may be displayed for each of the selection interfaces. For example, the setpoints may be displayed on user interface 152 of admin system 150. Setpoints may be implemented, for example, using hashmarks on a slider bar. Setpoints may be implemented, for example, using a name associated with a selector (e.g., a check box or radio button). Setpoints may be implemented, for example, using names in a drop-down list. The setpoints may correspond to firmware versions of a particular firmware component.

In some examples, the identification of firmware components and/or setpoints may be provided by the manager service 146 to the admin system 150. In some examples, the admin system 150 may itself store an identification of components and/or firmware versions for use in user interface 152.

The admin system 150 may receive user input selecting a selected setpoint on a particular selection interface. For example, a user may select a particular firmware version of a component that the user desires to use (e.g., install and/or upgrade to). The user input may be, for example, sliding of a slider bar to a particular setpoint. The user input may be checking a checkbox corresponding to the particular firmware version and/or selecting a radio button corresponding to the particular firmware version. The user input may be selecting a name of the version from a drop-down menu. Other mechanisms for providing user input may also be used. The user may be a human user and/or another computer process in some examples. The user may be, for example, a system administrator for the cluster. The user may be associated with an enterprise owning, operating, and/or using the cluster. The user may have responsibility for installation and/or maintenance of the cluster.

The user input may be provided to the manager service 146 from the admin system 150. The manager service 146 may evaluate the dependencies 148 based on the selection of a particular setpoint received from the user. Based on the evaluation, the manager service 146 may provide additional selected setpoints for others of the firmware components which may satisfy the dependencies 148. For example, versions of the remaining firmware components which, collectively together with the user-selected setpoint for a particular component, may be provided which may result in a compatible system. The additional selected setpoints may be provided by the manager service 146 to the admin system 150. Indications of the additional selected setpoints may be displayed in the user interface 152. For example, the additional selected setpoints may be highlighted, checked, identified, slid to, or otherwise selected.

Accordingly, a user may view a set of firmware versions for multiple firmware components that may form a compatible system installation, based on the selection of at least one firmware version for one component. This may facilitate installation and/or upgrade of a cluster to a compatible configuration and reduce errors or inconsistencies in upgrading components which may cause a system failure if dependent components are not appropriately installed and/or updated. By selecting a particular version of one component, a user can cause display of version selections for other components which form a compatible system.

The firmware components may then be installed and/or upgraded in accordance with the selected setpoint and the additional selected setpoints provided by the manager service 146. For example, an installation service operating on the controller VM 108 and/or the user may cause installation and/or upgrade of the firmware components in accordance with the setpoints. In some examples, the selected setpoints may be compared with currently-installed versions of the firmware components, and only firmware components requiring an upgrade to comply with the selected setpoints may be changed (e.g., installed and/or upgraded). Firmware components already present on the computing node with the firmware version associated with the relevant selected setpoint may not be upgraded in some examples.

Figure 2:
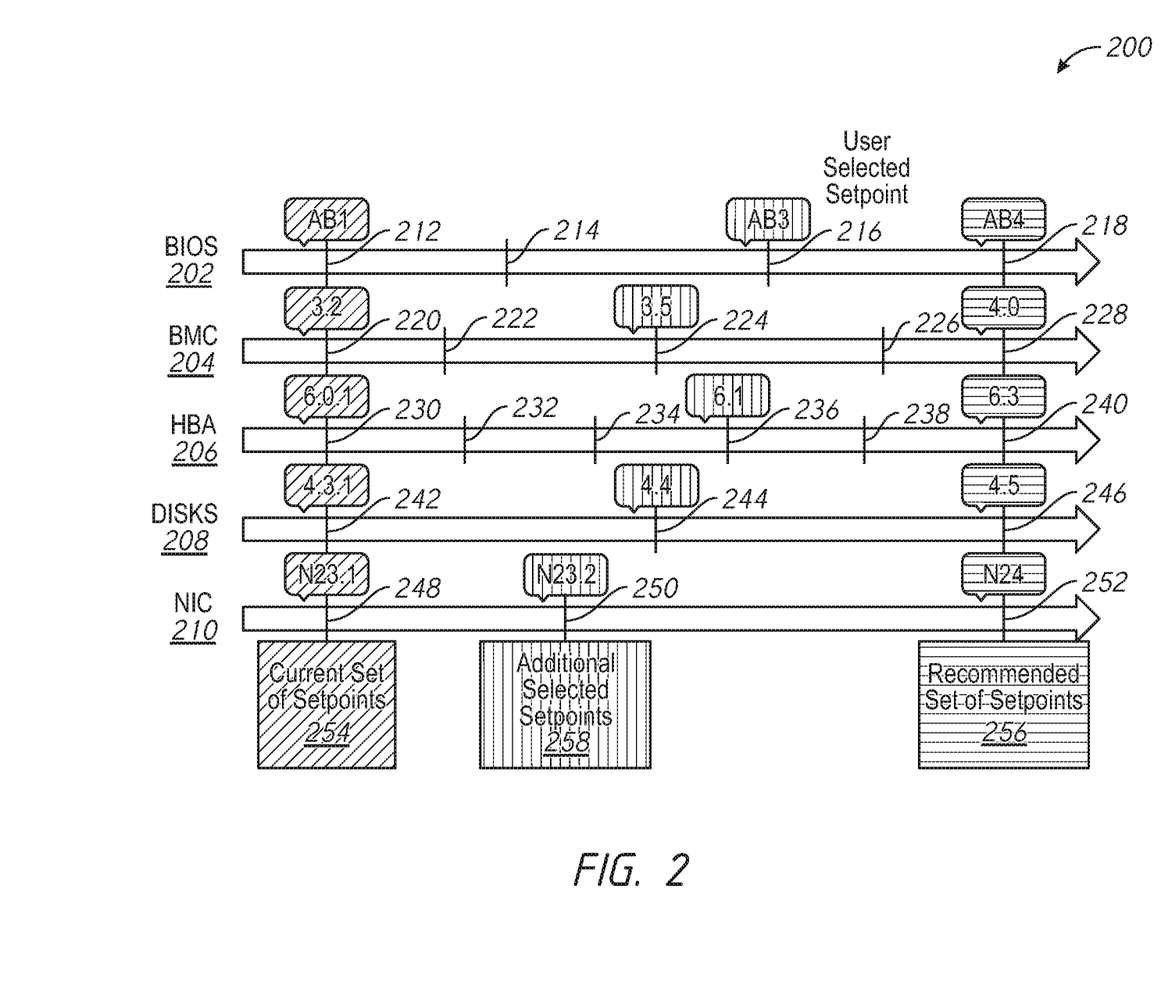
FIG. 2 is a schematic illustration of a user interface, which may be displayed, arranged in accordance with examples described herein.

FIG. 2 is a schematic illustration of a user interface, which may be displayed, arranged in accordance with examples described herein. The user interface 200 may be displayed, for example, on the user interface 152 of FIG. 1 using a display of the admin system 150. The user interface 200 includes selection interface 202, selection interface 204, selection interface 206, selection interface 208, and selection interface 210. The selection interface 202 includes setpoint 212, setpoint 214, setpoint 216, and setpoint 218. The selection interface 204 includes setpoint 220, setpoint 222, setpoint 224, setpoint 226, and setpoint 228. The selection interface 206 includes setpoint 230, setpoint 232, setpoint 234, setpoint 236, setpoint 238 and setpoint 240. The selection interface 208 includes setpoint 242, setpoint 244, and setpoint 246. The selection interface 210 includes setpoint 248, setpoint 250, and setpoint 252.

Generally, each selection interface may include arty number of setpoints. Recall the setpoints may each correspond with a version of the firmware component associated with the selection interface. The selection interfaces shown in FIG. 2 are implemented as slider bars, and the setpoints are shown as hashes. In the example of FIG. 2, the selection interface 202 is associated with BIOS firmware, the selection interface 204 is associated with BMC firmware, the selection interface 206 is associated with HBA firmware, the selection interface 208 is associated with disk firmware, and the selection interface 210 is associated with NIC firmware. Additional, fewer, and/or different components may be displayed in other examples.

During operation, a user may select a particular setpoint of a particular selection interface. So, for example, a user may select setpoint 216, which may correspond to version 'AB3' of the BIOS firmware. A manager service may receive an indication of the selection, and may evaluate dependencies related to the remaining displayed components. The manager service may accordingly make additional setpoint selections. For example, the manager service may select setpoint 224 for selection interface 204, which may correspond to version 3.5 of the BMC firmware. The manager service may select setpoint 236, which may correspond to version 6.1 of the HBA firmware. The manager service may select setpoint 244, which may correspond to version 4.4 of the disk firmware. The manager service may select setpoint 250, which may correspond to version 'N23.2' of the NIC firmware. Accordingly, the additional selected setpoints 258 selected by the manager service may include setpoint 224, setpoint 236, setpoint 244, and setpoint 250. Together with the user selected setpoint 216, these setpoints may be displayed, and are depicted using similar shading in FIG. 2. Installations and/or upgrades may be performed to realize the collection of firmware versions indicated by the additional selected setpoints 258 and the user selected setpoint 216.

The user interface 200 may additionally depict a current set of setpoints and/or a recommended set of setpoints which may be different than those developed by the manager service responsive to at least one user selection of a setpoint.

For example, the user interface 200 may depict current set of setpoints 254. The current set of setpoints 254 may reflect the firmware versions currently installed and/or in operation on a computing node. In the example of FIG. 2, the current set of setpoints 254 includes setpoint 212, setpoint 220, setpoint 230, setpoint 242, and setpoint 248. The setpoint 212 may correspond with version 'AB1' of the BIOS firmware. The setpoint 220 may correspond with version 3.2 of the BMC firmware. The setpoint 230 may correspond with version 6.0.1 of the MBA firmware. The setpoint 242 may correspond with the version 4.3.1 of the disk firmware. The setpoint 248 may correspond with the version 'N23.1' of the NIC firmware.

Comparing the current set of setpoints 254 with the additional selected setpoints 258 and the user selected setpoint 216, note that all components displayed may need to be upgraded to attain the configuration specified by the additional selected setpoints 258 and the user selected setpoint 216. In some examples, some of the additional selected setpoints 258 may be different than the current set of setpoints 254. In some examples, some of the additional selected setpoints 258 may be the same as the current set of setpoints 254.

The user interface 200 may depict a recommended set of setpoints, such as recommended set of setpoints 256 of FIG. 2. The recommended set of setpoints 256 may include setpoint 218, setpoint 228, setpoint 240, setpoint 246, and setpoint 252. The setpoint 218 may correspond with version 'AB4' of the BIOS firmware. The setpoint 228 may correspond with version 4.0 of the BMC firmware. The setpoint 240 may correspond with version 6.3 of the HBA firmware. The setpoint 246 may correspond with the version 4.5 of the disk firmware. The setpoint 252 may correspond with the version 'N24' of the NIC firmware. In some examples, some of the additional selected setpoints 258 may be different than the recommended set of setpoints 256. In some examples, some of the additional selected setpoints 258 may be the same as the recommended set of setpoints 256.

The recommended set of setpoints 256 may be a recommended set of setpoints, for example, based on the most recently available version(s) of the firmware components, and/or based on manufacturer or other user recommendations. Accordingly, a user may view a current set of setpoints 254 and a recommended set of setpoints 256. The user may nonetheless select a different setpoint, such as user selected setpoint 216. A different setpoint may be selected for any number of reasons. For example, a user may desire a particular firmware version for operation of some application or function. A user may desire a particular firmware version for compatibility with another component (not shown in FIG. 2). A user may desire a particular firmware version for performance or economic reasons. Other reasons may drive selection of a firmware version in other examples.

Accordingly, examples of systems and methods described herein may allow a user to select a firmware version for a component which may be different from a current version and may be different than an automated upgrade recommendation. For example, the user selected setpoint 216 is different than the setpoint 212 in the current set of setpoints 254 and different than the setpoint 218 in the recommended set of setpoints 256. Based on the user selected setpoint, manager services described herein may provide additional selected setpoints that provide a compatible system.

Figure 3:
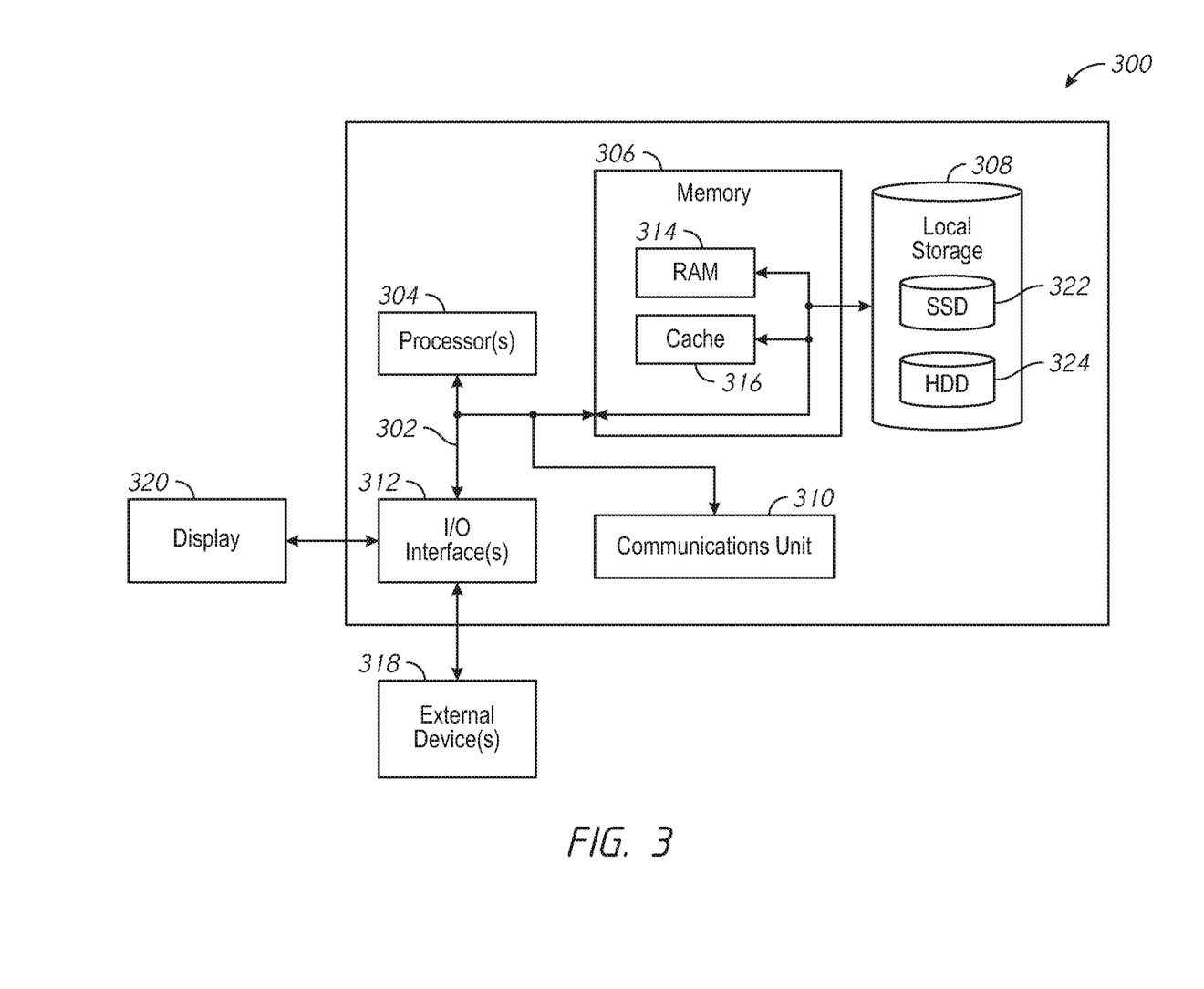
FIG. 3 depicts a block diagram of components of a computing node arranged in accordance with examples described herein.

FIG. 3 depicts a block diagram of components of a computing node arranged in accordance with examples described herein. It should be appreciated that FIG. 3 provides only an illustration of one implementation and does not imply any limitations with regard to the environments in which different embodiments may be implemented. Many modifications to the depicted environment may be made. The computing node 300 may implemented as the computing node 102 and/or computing node 112 of FIG. 1.

The computing node 300 includes one or more communications fabric(s) 302, which provides communications between one or more processor(s) 304, memory 306, local storage 308, communications unit 310, I/O interface(s) 312. The communications fabric(s) 302 can be implemented with any architecture designed for passing data and/or control information between processors (such as microprocessors, communications and network processors, etc.), system memory, peripheral devices, and any other hardware components within a system. For example, the communications fabric(s) 302 can be implemented with one or more buses.

The memory 306 and the local storage 308 are computer-readable storage media. In this embodiment, the memory 306 includes random access memory RAM 314 and cache 316. In general, the memory 306 can include any suitable volatile or non-volatile computer-readable storage media. The local storage 308 may be implemented as described above with respect to local storage 124 and/or local storage 130. In this embodiment, the local storage 308 includes an SSD 322 and an HDD 324, which may be implemented as described above with respect to SSD 126, SSD 132 and HDD 128, HDD 134 respectively.

Various computer instructions, programs, files, images, etc. may be stored in local storage 308 for execution by one or more of the respective processor(s) 304 via one or more memories of memory 306. In some examples, local storage 308 includes a magnetic HDD 324. Alternatively, or in addition to a magnetic hard disk drive, local storage 308 can include the SSD 322, a semiconductor storage device, a read-only memory (ROM), an erasable programmable read-only memory (EPROM), a flash memory, or any other computer-readable storage media that is capable of storing program instructions or digital information.

The media used by local storage 308 may also be removable. For example, a removable hard drive may be used for local storage 308. Other examples include optical and magnetic disks, thumb drives, and smart cards that are inserted into a drive for transfer onto another computer-readable storage medium that is also part of local storage 308.

Communications unit 310, in these examples, provides for communications with other data processing systems or devices. In these examples, communications unit 310 includes one or more network interface cards. Communications unit 310 may provide communications through the use of either or both physical and wireless communications links.

I/O interface(s) 312 allows for input and output of data with other devices that may be connected to computing node 300. For example, I/O interface(s) 312 may provide a connection to external device(s) 318 such as a keyboard, a keypad, a touch screen, and/or some other suitable input device. External device(s) 318 can also include portable computer-readable storage media such as, for example, thumb drives, portable optical or magnetic disks, and memory cards. Software and data used to practice embodiments of the present invention can be stored on such portable computer-readable storage media and can be loaded onto local storage 308 via I/O interface(s) 312. I/O interface(s) 312 also connect to a display 320.

Display 320 provides a mechanism to display data a user and may be, for example, a computer monitor.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A method comprising:
displaying first and second selection interfaces in a user interface, the first and second selection interfaces corresponding to a first and second firmware components, respectively, on a computing node;
displaying, in the user interface with the first and second selection interfaces, a first setpoint for the first selection interface and a second setpoint for the second selection interface, the first setpoint indicating a first firmware version of the first firmware component and the second setpoint indicating a second firmware version of the second firmware component, wherein the first firmware component includes one of a basic input/output (BIOS) firmware, a base management controller (BMC) firmware, a host bus adapter (HBA) firmware, or a disk firmware, wherein the second firmware component includes a different one of the BIOS firmware, the BMC firmware, the HBA firmware, or the disk firmware;
receiving user input selecting a selected third setpoint on the first selection interface, the selected third setpoint indicating a third firmware version of the first firmware component;
evaluating, using a manager service of the computing node, dependencies between the first and second firmware components to provide an additional selected setpoint for the second selection interface based on the selected third setpoint, the additional selected setpoint indicating a fourth firmware version of the second firmware component; and
displaying, in the user interface with the first and second selection interfaces, an indication of selection of the additional selected setpoint for the second selection interface.

2. The method of claim 1, further comprising upgrading the first and second firmware components of the computing node with the third and fourth firmware versions, respectively, associated with the selected third setpoint and the additional selected setpoint, respectively.

3. The method of claim 1, further comprising displaying, via the first selection interface, a first recommended set of setpoints indicating a first recommended set of versions for the first firmware component and displaying, via the second selection interface, a second recommended set of setpoints indicating a second recommended set of versions for the second firmware component.

4. The method of claim 3, further comprising displaying a first current setpoint and a second current setpoint indicating respective versions of the first and second firmware components, respectively, currently installed in the computing node.

5. The method of claim 3, further comprising receiving the user input selecting the selected third setpoint that is different than the first recommended set of setpoints.

6. The method of claim 1, further comprising displaying the first and second selection interfaces using slider bars.

7. The method of claim 1, further comprising displaying the first and second selection interfaces using drop-down lists.

8. The method of claim 1, further comprising displaying the first and second selection interfaces using radio buttons or checkboxes.

9. The method of claim 1, further comprising displaying, via the second selection interface, a range of compatible setpoints indicating a rage of compatible versions for the second firmware component based on the selected third setpoint.

10. At least one non-transitory computer-readable storage medium including instructions that when executed by a computing node, cause:
  display of first and second selection interfaces in a user interface, the first and second selection interfaces corresponding to first and second firmware components, respectively, on the computing node, wherein the first firmware component includes one of a basic input/output (BIOS) firmware, a base management controller (BMC) firmware, a host bus adapter (HBA) firmware, or a disk firmware, wherein the second firmware component includes a different one of the BIOS firmware, the BMC firmware, the HBA firmware, or the disk firmware;
  display of a first setpoint for the first selection interface and a second setpoint for the second selection interface in the user interface with the first and second selection interfaces, the first setpoint indicating a first firmware version of the first firmware component and the second setpoint indicating a second firmware version of the second firmware component;
  responsive to receipt of user input selecting a selected third setpoint indicating a third firmware version of the first firmware component on the first selection interface, evaluate, using a manager service of the computing node, a dependency between the first and second firmware components to provide an additional selected setpoint indicating a fourth firmware version of the second firmware component based on the selected third setpoint; and
  display of selection of the additional selected setpoint for the second selection interface in the user interface with the first and second selection interfaces.

11. The at least one computer-readable storage medium of claim 10, wherein the instructions further cause upgrade of the first and second firmware components of the computing node with the third and fourth firmware versions, respectively, indicated by the selected third setpoint and the additional selected setpoint, respectively.

12. The at least one computer-readable storage medium of claim 10, wherein the instructions further cause display, via the first selection interface, of a first recommended set of setpoints indicating a first recommended set of versions for the first firmware component and display, via the second selection interface, of a second recommended set of setpoints indicating a second recommended set of versions for the second firmware component.

13. The at least one computer-readable storage medium of claim 12, wherein the instructions further cause display of a first current setpoint and a second current setpoint indicating versions of the first and second firmware components, respectively, currently installed in the computing node.

14. The at least one computer-readable storage medium of claim 12, wherein the instructions further cause receipt of the user input selecting the selected third setpoint that is different than the first recommended set of setpoints.

15. The at least one computer-readable storage medium of claim 10, wherein the instructions further cause display of the first and second selection interfaces using slider bars.

16. The at least one computer-readable storage medium of claim 10, wherein the instructions further cause display of the first and second selection interfaces using drop-down lists.

17. The at least one computer-readable storage medium of claim 10, wherein the instructions further cause display, via the second selection interface, of a range of compatible setpoints indicating a rage of compatible versions for the second firmware component based on the selected third setpoint.

18. A computer system, comprising:
  a memory configured to store instructions for an administrative system; and
  a processor configured to execute the instructions for the administrative system to:
  cause display of first and second selection interfaces in a user interface, the first and second selection interfaces corresponding to the first and second firmware components of a computing node, respectively, on a display, wherein the first firmware component includes one of a basic input/output (BIOS) firmware, a base management controller (BMC) firmware, a host bus adapter (HBA) firmware, or a disk firmware, wherein the second firmware component includes different one of the BIOS firmware, the BMC firmware, the HBA firmware, or the disk firmware;
  cause display of a first setpoint for the first selection interface and a second setpoint for the second selection interface in the user interface with the first and second selection interfaces, the first setpoint indicating a first firmware version of the first firmware component and the second setpoint indicating a second firmware version of the second firmware component;
  responsive to receipt of user input selecting a selected third setpoint indicating a third firmware version of the first firmware component on the first selection interface, evaluate, using a manager service of the computing node, a dependency between the first and second firmware components to provide a range of compatible setpoints indicating a range of compatible versions of the second firmware component for the second selection interface based on the selected third setpoint; and
  cause display of selection of the range of compatible setpoints for the second selection interface in the user interface with the first and second selection interfaces.

19. The computer system of claim 18, wherein the processor is further configured to execute the instructions for the administrative system to cause display of the first and second selection interfaces using drop-down lists.

20. The computer system of claim 18, wherein the processor is further configured to execute the instructions for the administrative system to cause display of the first and second selection interfaces using radio buttons or checkboxes.

21. The computer system of claim 18, wherein the processor is further configured to execute the instructions for the administrative system to cause display of a selected fourth setpoint of the range of compatible setpoints for the second selection interface based on the selected third setpoint, the selected fourth setpoint indicating a fourth firmware version of the second firmware component.

22. The computer system of claim 21, wherein the processor is further configured to execute the instructions for the administrative system to cause upgrade of the first and second firmware components with the third and fourth firmware versions, respectively, indicated by the selected third and fourth setpoints, respectively.

* * * * *